US010266276B2

(12) United States Patent
Beuning et al.

(10) Patent No.: US 10,266,276 B2
(45) Date of Patent: Apr. 23, 2019

(54) INTEGRATED AUXILIARY POWER UNIT, STARTER-GENERATOR-MOTOR, AND VAPOR CYCLE COOLING SYSTEM FOR AN AIRCRAFT

(71) Applicant: Textron Innovations, Inc., Providence, RI (US)

(72) Inventors: Charles Beuning, Wichita, KS (US); Nathan Roy Ebersole, Wichita, KS (US); John W. Gallman, Wichita, KS (US); Nathaniel David Diedrich, Wichita, KS (US); Vernon Weng-Yew Change, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 931 days.

(21) Appl. No.: 14/219,424

(22) Filed: Mar. 19, 2014

(65) Prior Publication Data

US 2016/0185461 A1   Jun. 30, 2016

Related U.S. Application Data

(63) Continuation-in-part of application No. 14/211,876, filed on Mar. 14, 2014, now abandoned.
(Continued)

(51) Int. Cl.
*B64D 41/00* (2006.01)
*B64D 13/06* (2006.01)

(52) U.S. Cl.
CPC .......... *B64D 41/00* (2013.01); *B64D 13/06* (2013.01); *B64D 2013/0611* (2013.01);
(Continued)

(58) Field of Classification Search
CPC  B64D 41/00; B64D 13/06; B64D 2013/0611; B64D 2013/0648
See application file for complete search history.

(56) References Cited

U.S. PATENT DOCUMENTS

RE21,837 E  *  6/1941  Alexander ............ F25D 11/003
                                                        318/1
3,327,823 A  *  6/1967  Miller .................... F16D 27/118
                                                        192/69.8
(Continued)

FOREIGN PATENT DOCUMENTS

WO   WO 2012025687 A2 *  3/2012  ............ B64D 41/00

*Primary Examiner* — Viet P Nguyen
(74) *Attorney, Agent, or Firm* — Erise IP, P.A.

(57) ABSTRACT

A system for an aircraft includes a compressor for a vapor cycle cooling system (VCCS) for providing cabin air conditioning; an APU for mechanically driving the VCCS compressor; and a starter-generator-motor (SGM) apparatus operable in any of a starter mode, a generator mode, or a motor mode. The SGM apparatus includes: (i) a first coupling element for coupling the SGM apparatus to the APU such that, in the starter mode, the SGM apparatus is used in driving and starting the APU, (ii) a second coupling element for coupling the SGM apparatus to the VCCS compressor such that, in the motor mode, the SGM apparatus mechanically drives the VCCS compressor, and (iii) a set of electrical power terminals at which, in the generator mode, the SGM apparatus provides electrical output power for powering the aircraft electrical system (including the VCCS condenser fan and VCCS evaporator fans) and, in the starter mode and motor mode, the SGM apparatus receives electrical input power from an external electrical power source.

20 Claims, 18 Drawing Sheets

Related U.S. Application Data

(60) Provisional application No. 61/785,911, filed on Mar. 14, 2013.

(52) U.S. Cl.
CPC ............. *B64D 2013/0648* (2013.01); *B64D 2013/0674* (2013.01); *B64D 2013/0696* (2013.01); *Y02T 50/56* (2013.01)

(56) References Cited

U.S. PATENT DOCUMENTS

| | | | | |
|---|---|---|---|---|
| 4,684,081 | A * | 8/1987 | Cronin | B64D 13/06 244/118.5 |
| 4,803,376 | A * | 2/1989 | N'Guyen | F02N 11/04 290/22 |
| 5,899,085 | A * | 5/1999 | Williams | B64D 13/06 62/236 |
| 6,002,219 | A * | 12/1999 | Permuy | F02N 11/04 180/287 |
| 6,919,661 | B2 | 7/2005 | Dubus et al. | |
| 7,013,646 | B1 * | 3/2006 | Serkh | 60/698 |
| 7,049,707 | B2 * | 5/2006 | Wurtele | B60H 1/00378 290/1 A |
| 7,224,145 | B2 | 5/2007 | Pierret et al. | |
| 7,291,932 | B2 * | 11/2007 | Wurtele | B60H 1/00378 290/1 A |
| 7,402,916 | B2 | 7/2008 | Taspinar et al. | |
| 7,849,680 | B2 | 12/2010 | Shaff et al. | |
| 2006/0218934 | A1 * | 10/2006 | Williams | B64D 41/00 60/785 |
| 2006/0237583 | A1 * | 10/2006 | Fucke | B64D 13/06 244/58 |
| 2007/0267540 | A1 * | 11/2007 | Atkey | B64D 13/06 244/58 |
| 2009/0065294 | A1 | 3/2009 | O'Malley et al. | |
| 2009/0102790 | A1 * | 4/2009 | Chatterjee | G06F 3/03543 345/163 |
| 2009/0305092 | A1 * | 12/2009 | Fucke | B64D 13/06 429/495 |
| 2010/0152958 | A1 | 6/2010 | McAndrew | |
| 2012/0004061 | A1 * | 1/2012 | Tiwari | B60K 6/445 475/5 |
| 2013/0056992 | A1 * | 3/2013 | Wada | F01K 23/065 290/1 A |
| 2013/0151039 | A1 * | 6/2013 | Haillot | B64D 41/00 701/3 |
| 2016/0039371 | A1 * | 2/2016 | Blumer | B60L 11/02 290/31 |

\* cited by examiner

INTEGRATED AUXILIARY POWER UNIT, STARTER-GENERATOR-MOTOR, AND VAPOR CYCLE COOLING SYSTEM FOR AN AIRCRAFT

RELATED APPLICATIONS

This U.S. nonprovisional application is a continuation-in-part of U.S. application Ser. No. 14/211,876, entitled "Integrated Auxiliary Power Unit, Starter-Generator-Motor, And Vapor Cycle Cooling System For An Aircraft," filed Mar. 14, 2014, which claims the benefit of U.S. Provisional Application No. 61/785,911, entitled, "Integrated Auxiliary Power Unit (APU) and Vapor Cycle Cooling System for an Aircraft and Hybrid Starter-Generator-Motor for an Aircraft APU," filed Mar. 14, 2013. The entire contents of each of the aforementioned applications is incorporated herein by reference.

BACKGROUND

1. Field of the Invention

The invention relates to auxiliary power units (APUs), starters, generators, motors, and cooling systems for aircraft and, more particularly, to an integrated auxiliary power unit (APU), starter-generator-motor (SGM), and vapor cycle cooling system (VCCS) for an aircraft.

2. Discussion of the Related Art

Some conventional business and commercial aircraft are equipped with auxiliary power units (APUs). A conventional aircraft APU is based on a turbine engine and provides pneumatic power and mechanical shaft power output. The mechanical shaft can be used to drive accessories such as mechanically-driven pneumatic compressors, refrigerant compressors, hydraulic pumps, fuel pumps, electrical generators, and/or electrical starter-generators, or can be driven by accessories such as a starter or electrical starter-generator. When the mechanical shaft power drives a generator, it provides electrical power to the aircraft electrical systems for such tasks as environmental control, lighting, powering of electronics, main engine starting, etc. Pneumatic power can be provided from the internal compressor inside the APU's turbine engine or a mechanically-driven pneumatic compressor. Pneumatic power is typically used with an air cycle cooling system (ACCS).

Instead of an air cycle cooling system, some aircraft include a vapor cycle cooling system (VCCS) to air condition the aircraft cabin. The VCCS includes a refrigerant compressor, a condenser, a condenser fan, and evaporator fans. The VCCS compressor is typically mechanically-driven and the condenser fan and evaporator fans are typically electrically-powered for the VCCS to provide aircraft cabin cooling. To that end, when the APU is operating, the APU can provide the capability to mechanically-drive the VCCS compressor. When the APU is not operating and the SGM is in motor mode, the SGM can receive external electrical power to mechanically drive the VCCS compressor. Electrical power to operate the VCCS condenser fan and VCCS evaporator fans can be provided by the SGM when it is in generator mode or by an external electrical power source when the SGM is in motor mode.

The APU and VCCS compressor would be attached to a starter-generator-motor apparatus (SGM). The SGM is operable in any of a starter mode, a generator mode, or a motor mode. In the starter mode, the SGM can mechanically drive and start the APU; in generator mode, the SGM is driven by the APU and produces electrical power that can be delivered to the aircraft electrical system (including to power the VCCS condenser fan and VCCS evaporator fans); in the motor mode, the SGM can receive electrical power from an external electrical power source and be electrically-driven to mechanically drive the VCCS compressor. SGMs are known in the art, and are described in U.S. Pat. Nos. 4,803,376 and 6,002,219.

SUMMARY

According to one aspect, the present disclosure is directed to a system for an aircraft, the system comprising an APU, a starter-generator-motor (SGM) apparatus, and a refrigerant vapor cycle cooling system (VCCS) compressor. The VCCS provides air conditioning for the aircraft cabin and consists of a refrigerant compressor, a refrigerant condenser, a condenser fan, and evaporator fans. When the APU is operating, the APU mechanically drives the VCCS compressor and, when the SGM is in generator mode, the APU mechanically drives the SGM. The SGM apparatus is operable in any of a starter mode, a generator mode, or a motor mode. The SGM apparatus comprises: (i) a first coupling element for coupling the SGM apparatus to the APU such that, in the starter mode, the SGM apparatus is used in driving and starting the APU or, in the generator mode, the SGM apparatus is driven by the APU, (ii) a second coupling element for coupling the SGM apparatus to the VCCS compressor such that, in the motor mode, the SGM apparatus mechanically drives the VCCS compressor, and (iii) a set of electrical power terminals (one positive and one negative) at which, in the generator mode, the SGM apparatus provides electrical output power for powering the aircraft electrical system (including the VCCS condenser fan and VCCS evaporator fans) and, in the starter mode or motor mode, the SGM apparatus receives electrical input power from an external electrical power source.

In some exemplary embodiments, the APU is a piston engine. Alternatively, the APU can also be a turbine engine.

In some exemplary embodiments, the first coupling element comprises a clutch for mechanically coupling the SGM apparatus to the APU. In some exemplary embodiments, the clutch is an electromechanical tooth clutch.

In some exemplary embodiments, the second coupling element comprises a clutch for mechanically coupling the SGM apparatus to the VCCS compressor.

In some exemplary embodiments, the second coupling element comprises a pulley.

In some exemplary embodiments, the second coupling element comprises a belt.

In some exemplary embodiments, the system further comprises a fireproof enclosure. In some exemplary embodiments, the VCCS compressor, the APU and the SGM apparatus are contained within the fireproof enclosure.

According to another aspect, the present disclosure is directed to an integrated auxiliary power unit (APU), starter-generator-motor apparatus (SGM), and a refrigerant vapor cycle cooling system (VCCS) compressor for an aircraft. The integrated APU, SGM, and VCCS include a fireproof enclosure, an APU, a starter-generator-motor (SGM), and a refrigerant compressor for the VCCS. When the APU is operating, the APU mechanically drives the VCCS compressor and, when the SGM is in generator mode, the APU mechanically drives the SGM. The SGM apparatus is operable in any of a starter mode, a generator mode, or a motor mode. The SGM apparatus comprises: (i) a first coupling element for coupling the SGM apparatus to the APU such that, in the starter mode, the SGM apparatus is used in driving and starting the APU or, in the generator mode, the SGM apparatus is driven by the APU, (ii) a second coupling element for coupling the SGM apparatus to the VCCS compressor such that, in the motor mode, the SGM apparatus mechanically drives the VCCS compressor, and (iii) a set of electrical power terminals (one positive and one negative) at which, in the generator mode, the SGM apparatus provides electrical output power for powering the aircraft electrical system (including the VCCS condenser fan and VCCS evaporator fans) and, in the starter mode or motor mode, the SGM apparatus receives electrical input power from an external electrical power source. The APU, the SGM apparatus, and the VCCS compressor are all disposed within the fireproof enclosure.

In some exemplary embodiments, the APU is a piston engine.

In some exemplary embodiments, the first coupling element comprises a clutch for mechanically coupling the SGM apparatus to the APU. In some exemplary embodiments, the clutch is an electromechanical tooth clutch.

In some exemplary embodiments, the second coupling element comprises a clutch for mechanically coupling the SGM apparatus to the VCCS compressor.

In some exemplary embodiments, the second coupling element comprises a pulley.

In some exemplary embodiments, the second coupling element comprises a belt.

BRIEF DESCRIPTION OF THE DRAWINGS

The foregoing and other features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
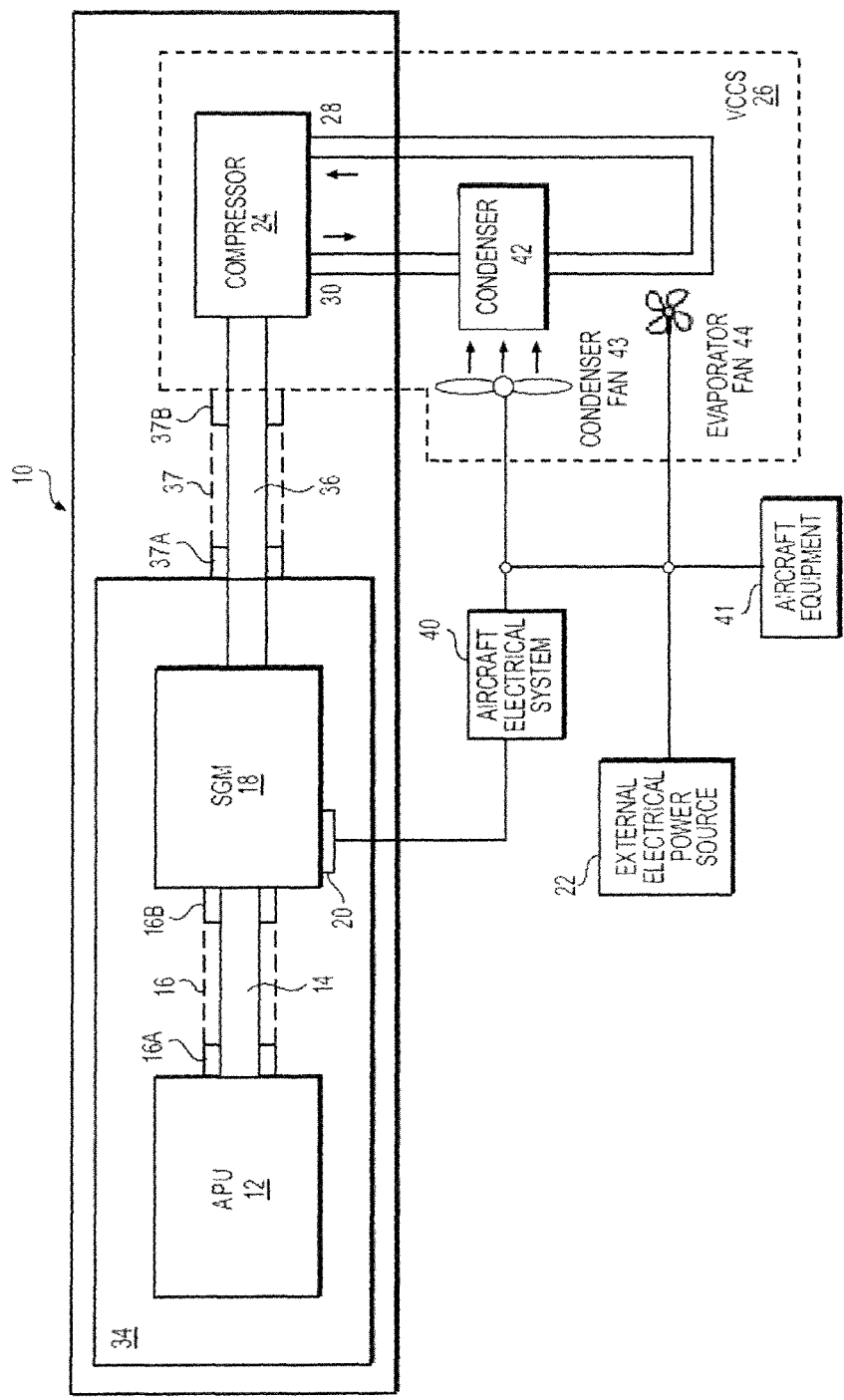
FIG. 1 includes a schematic block diagram of an integrated APU, SGM apparatus, and VCCS compressor, according to some exemplary embodiments.

The present invention relates to an auxiliary power unit (APU), a starter, a generator, a motor, and a vapor cycle cooling system (VCCS) for an aircraft. The integrated APU, SGM apparatus, and VCCS compressor, in the disclosed embodiment of the invention includes a reversible energy-conversion device, meaning one that is both able to take electrical energy and turn it into a mechanical energy, but also is capable of taking mechanical energy, and converting it into electrical energy. In an embodiment, a starter-generator-motor (SGM) is used for this purpose. SGMs like the ones useable in the embodiments disclosed herein are known in the art. Examples of SGMs which might be used can be found in U.S. Pat. Nos. 7,402,916, 7,224,145, and 6,919,661. For example, U.S. Pat. No. 7,402,916 relates to an alternator-starter for a vehicle, particularly a motor vehicle, and claims a method for controlling the phases of the stator of the alternator. According to some exemplary embodiments, the SGM can be operated as a starter for a reciprocating piston engine or a turbine engine, a generator of electrical power for the aircraft, and an electric motor that can be used to drive an air conditioning refrigerant compressor of the VCCS of the aircraft. According to some exemplary embodiments, the SGM can be integrated with the APU and the aircraft VCCS via mechanical coupling to the APU and the VCCS compressor, respectively. When the APU is operating, the APU (e.g. reciprocating piston engine) provides rotational motion to mechanically drive the VCCS compressor and, when the SGM is in generator mode, the APU mechanically drives the SGM to produce electrical power. When an external electrical power source is available, the APU can be shut down. The APU's mechanical shaft may be disengaged, and the SGM, when in motor mode, may receive external electrical power to create rotational motion in the SGM's mechanical shaft, which then mechanically drives the VCCS compressor.

It should be noted that throughout this Detailed Description, the APU started by the SGM is referred to as an APU, but is a piston engine or reciprocating piston engine. It will be understood that the invention is also applicable to other types of engines, for example, turbine engines. If a turbine engine is used, then a gearbox is included to reduce the turbine speed to a speed that works with the SGM and compressor.

In some exemplary embodiments, the APU and SGM are mechanically coupled by a mechanical coupling mechanism, which can include one or more rotatable shafts, via a clutch or similar device. The integrated APU-SGM-VCCS compressor system can operate first in a Starter mode, in which the SGM is used to provide rotational shaft motion to start the APU. To that end, external electrical power, such as from a ground power cart or an aircraft battery, can be received by the SGM, and the SGM can be electrically driven to produce a rotational motion in its mechanical shaft. The mechanical output of the SGM turns the APU's mechanical shaft to start the APU (e.g. reciprocating piston engine). After the APU starts, the Starter mode is terminated. The Generator mode can then be initiated. In the Generator mode, the APU provides rotational motion through its mechanical shaft to, e.g., turn a rotatable mechanical shaft of the SGM, such that the SGM generates electrical power, which can sent to power the aircraft electrical system (including the VCCS condenser fan and VCCS evaporator fans). At the same time, the APU can be mechanically coupled to the VCCS compressor, such that the VCCS compressor is mechanically driven, and air conditioning/cooling is provided to the aircraft cabin.

When APU power is otherwise no longer required, the APU (e.g. reciprocating piston engine) is typically shut down, such that the APU is no longer mechanically driving the VCCS compressor to provide cabin air conditioning and is no longer mechanically driving the SGM to generate electrical power. When an external electrical power source is available, the SGM can initiate a Motor mode in which external electrical power, such as electrical power from an aircraft main propulsion engine generator, is received by the SGM. The SGM can be electrically driven to produce a rotational motion in its mechanical shaft. The mechanical output of the SGM turns the VCCS compressor's mechanical shaft to compress the refrigerant needed for cabin air conditioning. It should be noted that the Motor mode can also be initiated without the aircraft main propulsion engine running if a ground power cart is available to send external electrical power to the SGM.

FIG. 1 includes a schematic functional block diagram illustrating a system having an integrated APU-SGM-VCCS compressor system 10, according to some exemplary embodiments. Referring to FIG. 1, the system 10 includes an APU 12, which can be, for example, a reciprocating piston engine, a SGM 18, and a VCCS compressor 24. APU 12 provides rotational mechanical output via a mechanical coupling mechanism, which can be, in some exemplary embodiments, a rigid, rotatable shaft 14. Rotatable shaft 14 is mechanically coupled to SGM 18. Shaft 14 is shown coupled directly to SGM 18. It will be understood that, in some embodiments, shaft 14 can be indirectly coupled to SGM 18, i.e., shaft 14 can be mechanically coupled to SGM 18 via one or more pulleys and belts and/or chains, and/or other such mechanical mechanisms by which rotational motion can be coupled between components of a mechanical system such as system 10.

Shaft 14 is releasably coupled between APU 12 and SGM 18. That is, shaft 14 may be engaged to transmit rotational motion from APU 12 to SGM 18, or shaft 14 may be engaged to transmit rotational motion from SGM 18 to APU 12, or shaft 14 may be disengaged such that no rotational motion is transmitted between APU 12 and SGM 18. To that end, in some exemplary embodiments, shaft 14 is coupled between APU 12 and SGM 18 via a clutch mechanism generically depicted in FIG. 1 as 16A and 16B. Clutch mechanism 16A and 16B, referred to generally hereinafter as clutch mechanism 16, can be, for example, in the case in which shaft 14 is directly coupled between APU 12 and SGM 18, an electromechanical tooth clutch, which can be controllable to selectively release and maintain the direct mechanical coupling of shaft 14 between APU 12 and SGM 18. Alternatively, where shaft 14 is indirectly coupled between APU 12 and SGM 18, such as by one or more pulleys, belts and/or chains, clutch mechanism 16 can include a pulley clutch, which is controllable to selectively release and maintain the indirect mechanical coupling between engine 12 and SGM 18.

SGM 18 includes a set of external power terminals (one positive and one negative) 20, which receives external electrical power from an external electrical power source 22, which can be, for example, an aircraft battery or a ground power cart. In certain operational modes of the SGM 18, as described in detail below, the SGM 18 produces rotational motion, such as in shaft 14 coupled between APU 12 and SGM 18, in response to and using the received external electrical power at the set of external power terminals 20. The external electrical power source which supplies external electrical power to the set of external power terminals 20, can also be the main aircraft propulsion engine generator driven by the aircraft propulsion system.

APU 12 and/or SGM 18 are mechanically coupled to VCCS compressor 24 of the aircraft VCCS 26. APU 12 and/or SGM 18, either in combination indicated by outline box 34 in FIG. 1, or individually, provide rotational motion to VCCS compressor 24 to drive VCCS compressor 24 to compress the refrigerant needed by VCCS 26 to provide cabin air conditioning. In combination, APU 12 and SGM 18 can include a through shaft which is driven into rotation by APU 12 and passes through SGM 18 to VCCS compressor 24. The mechanical coupling of APU 12 and SGM 18 to VCCS compressor 24 is indicated by mechanical coupling mechanism 36 in FIG. 1. The configuration of mechanical coupling mechanism 36, and, therefore, the configuration of system 10, can be different according to different exemplary embodiments described herein in detail. In accordance with some exemplary embodiments, VCCS compressor 24 is driven by SGM 18 or APU 12 such that, depending on operational modes of system 10, APU 12 and SGM 18, VCCS 26 provides cabin air conditioning both while the aircraft is on the ground and while the aircraft is in flight. VCCS compressor 24 is coupled to the remainder of VCCS 26 (e.g. VCCS condenser 42, VCCS condenser fan 43, and VCCS evaporator fans 44) via refrigerant lines 28 and 30. That is, VCCS compressor 24 receives VCCS refrigerant via refrigerant input line 28 and outputs refrigerant back to the remainder of VCCS 26 via refrigerant output line 30.

According to some exemplary embodiments, system 10 can operate in a Starter mode, in which SGM 18 is used to start APU 12. To that end, electrical power from the external electrical power source 22 is received by SGM 18. In response, rotational motion is coupled from SGM 18 to APU 12, such as by rotatable shaft 14. Shaft 14 turns APU 12 to start APU 12. After APU 12 starts, the Starter mode is terminated, such that rotational motion is no longer transmitted to APU 12 from SGM 18 and the electrical power from the external electrical power source 22 is no longer transmitted to SGM 18.

When APU 12 is running, the Generator mode can be initiated. In the Generator mode, APU 12 provides rotational motion to SGM 18, such as by turning rotatable shaft 14. In response to the rotational motion, SGM 18 generates electrical power, which is sent via a set of external electrical power terminals 20 to power the aircraft electrical system (including the VCCS condenser fan and VCCS evaporator fans).

When APU power is otherwise no longer required, APU 12 can be shut down, such that APU 12 is no longer driving VCCS compressor 24 to provide cabin air conditioning and/or SGM 18 to generate electrical power. With APU 12 shut down, but with an external electrical power source 22 available, SGM 18 can initiate a Motor mode, in which external electrical power, such as power from the aircraft main propulsion engine generator or a ground power cart, is received by SGM 18 at a set of external electrical power terminals 20. In response to the received external electrical power, SGM 18, operating in Motor mode, can produce rotational driving motion to VCCS compressor 24 via mechanical coupling mechanism 36 to mechanically drive VCCS compressor 24 to compress the refrigerant needed by the VCCS 26 to provide cabin air conditioning. The external electrical power source 22, such as the aircraft's main propulsion engine generator, will supply electrical power to the VCCS condenser fan 43 and the VCCS evaporator fans 44.

Like shaft 14, mechanical coupling mechanism 36 releasably couples VCCS compressor 24 to APU 12 and/or SGM 18 or combination 34 of APU 12 and SGM 18. That is, mechanical coupling mechanism 36 may be engaged to transmit rotational motion to VCCS compressor 24, or mechanical coupling mechanism 36 may be disengaged such that no rotational motion is transmitted to VCCS compressor 24. To that end, in some exemplary embodiments, mechanical coupling mechanism 36 is coupled to VCCS compressor 24 via a clutch mechanism generically depicted in FIG. 1 as clutch mechanism 37A and 37B. Clutch mechanism 37A and 37B, referred to generally hereinafter as clutch mechanism 37, can be, for example, an electromechanical tooth clutch, which can be controllable to selectively release and maintain the direct mechanical coupling of mechanical coupling mechanism 36 to VCCS compressor 24. Alternatively, where mechanical coupling mechanism 36 is indirectly coupled to VCCS compressor 24, such as by one or more pulleys, belts and/or chains, clutch mechanism 37 can include a pulley clutch, which is controllable to selectively release and maintain the indirect mechanical coupling to VCCS compressor 24.

According to the present disclosure, the system including an integrated APU, SGM apparatus, and VCCS compressor can be configured in any of many different arrangements. FIGS. 2 through 10 include schematic perspective views of several possible configurations of the system, according to several exemplary embodiments.

Figure 2:
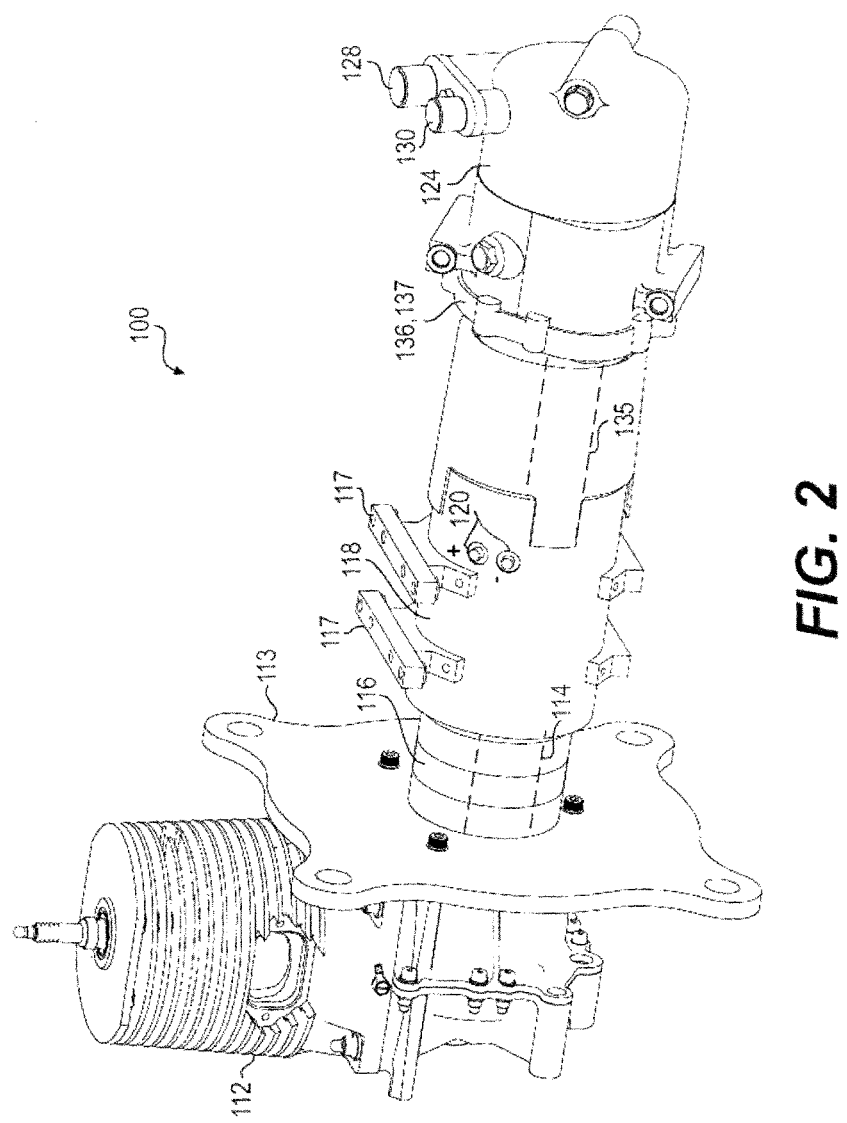
FIG. 2 includes a schematic perspective view of a system including an integrated APU, SGM apparatus, and VCCS compressor, according to some exemplary embodiments.

FIG. 2 includes a schematic perspective view of a system 100 including an integrated APU 112, SGM apparatus 118, and VCCS compressor 124, according to some exemplary embodiments. Referring to FIG. 2, system 100 includes a "direct-drive" configuration in which APU 112 is directly coupled to SGM 118. System 100 can be mounted within an aircraft using mounting flange 113 and mounting brackets 117 on SGM 118. In the illustrated direct-drive configuration, SGM 118 is also directly coupled to VCCS compressor 124. VCCS compressor 124 includes a refrigerant input 128 at which refrigerant from the rest of the VCCS is received and a refrigerant output 130 at which refrigerant is transmitted to the rest of the VCCS.

Referring to FIG. 2, as described above, APU 112 and SGM 118 are releasably coupled by clutch mechanism 116. Clutch mechanism 116 is controllable such that rigid rotatable shaft 114 (shown in phantom) mechanically coupling APU 112 and SGM 118 can be controllably engaged and disengaged such that rotational motion can be controllably coupled between APU 112 and SGM 118 via rigid rotatable shaft 114, depending on the operational mode in which system 100 is operating, as described above in detail. In the particular exemplary embodiments illustrated in FIG. 2, clutch mechanism 116 can be an electromechanical tooth clutch mechanism.

In the direct-drive configuration of FIG. 2, SGM 118 is also directly coupled to VCCS compressor 124. That is, a mechanical coupling mechanism 136, with clutch mechanism 137, releasably, mechanically couples, such as by a rigid rotatable shaft 135 (shown in phantom), SGM 118 to VCCS compressor 124. Clutch mechanism 137 is controllable such that rigid rotatable shaft 135 mechanical coupling between SGM 118 and VCCS compressor 124 can be controllably engaged and disengaged such that rotational motion can be controllably coupled between SGM 118 and VCCS compressor 124 via rigid rotatable shaft 135, depending on the operational mode in which system 100 is operating, as described above in detail. In the particular exemplary embodiments illustrated in FIG. 2, clutch mechanism 137 can be an electromechanical tooth clutch mechanism.

In the Starter mode, as described above, clutch mechanism 116 can be controlled to engage mechanical coupling of APU 112 to SGM 118 via shaft 114 such that SGM 118 drives shaft 114 into rotation to transmit rotational motion to APU 112 to start APU 112, when external electrical power is received by SGM 118 at the set of external power terminals 120. In the Generator mode, as described above, clutch mechanism 116 can be controlled to engage mechanical coupling via shaft 114 between APU 112 and SGM 118 such that APU 112 drives shaft 114 into rotation to transmit rotational motion to SGM 118 such that SGM 118 generates and outputs electrical power at the set of external power terminals 120 to the aircraft electrical system 40 (including VCCS condenser fan 43 and VCCS evaporator fans 44). The rotational motion imparted by engine APU to SGM 118 may also be mechanically coupled to VCCS compressor 124 via shaft 135 to drive VCCS compressor 124 to compress the refrigerant needed by the VCCS 26 to provide cabin air conditioning. Mechanical coupling mechanism 136 and clutch mechanism 137 can be controlled to selectively enable this coupling of rotational motion to VCCS compressor 124 to selectively disable and enable cabin air conditioning in the Generator mode. In the Motor mode, external electrical power can be received by SGM 118 via the set of external electrical power terminals 120 to rotate shaft 135. The rotational motion in shaft 135 can be transmitted to VCCS compressor 124 via shaft 135 to drive VCCS compressor 124 to compress the refrigerant needed by the VCCS 26 to provide cabin air conditioning. Mechanical coupling mechanism 136 and clutch mechanism 137 can be controlled to selectively enable this coupling of rotational motion to VCCS compressor 124 to selectively disable and enable cabin air conditioning in the Motor mode. External electrical power is used to directly power the VCCS condenser fan 43 and VCCS evaporator fans 44.

Figure 3:
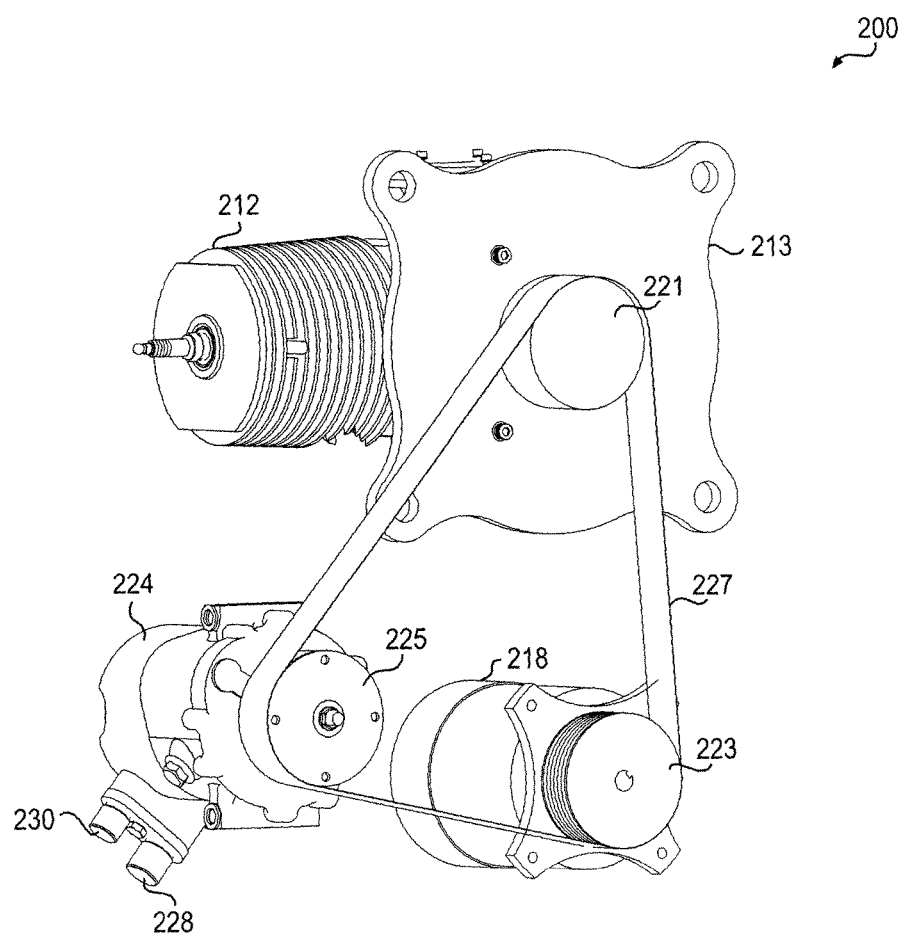
FIG. 3 includes a schematic perspective view of a system including an integrated APU, SGM apparatus, and VCCS compressor, according to some exemplary embodiments.

FIG. 3 includes a schematic perspective view of a system 200 including an integrated APU 212, SGM apparatus 218, and VCCS compressor 224, according to some exemplary embodiments. Referring to FIG. 3, system 200 is an "indirect-drive" system, in contrast with the direct-drive system 100 illustrated and described above in detail in connection with FIG. 2. Referring to FIG. 3, instead of direct in-line mechanical coupling between components using, for example, shafts and toothed clutches, the components in system 200 of FIG. 3 are coupled via one or more clutch pulleys and one or more belts and/or chains. Specifically, system 200 of FIG. 3 includes an engine 212, which provides output rotation motion which drives an engine pulley 221 into rotation, as required by the operational mode in which system 200 is operating. System 200 also includes an SGM 218, which also includes a pulley 223 for coupling rotational motion to and from SGM 218. System 200 also includes VCCS compressor 224, which includes a pulley 225 for coupling rotational motion to VCCS compressor 224 to drive VCCS compressor 224 to provide cabin air conditioning. Pulleys 221, 223 and 225 are mechanically coupled together by one or more belts and/or chains 227.

Referring to FIG. 3, operation of system 200 is the same as that of system 100 illustrated and described in detail above in connection with FIG. 2. Mechanically, instead of toothed clutches in the direct-drive configuration of FIG. 2 being controllable to selectively engage and disengage mechanical coupling between components, one or more clutch pulleys are used in the embodiments of FIG. 3. The clutch pulleys are controllable such that they selectively engage and disengage mechanical coupling between components as required to carry out the operational requirements of system 200. Specifically, pulley 221 on APU 212 can be a clutch pulley which is controllable to selectively engage and disengage the mechanical coupling between APU 212 and SGM 218 to implement the operational modes of system 200, as described above in detail. Also, pulley 225 on VCCS compressor 224 can be a clutch pulley which is controllable to selectively engage and disengage the mechanical coupling between APU 212, SGM 218 and VCCS compressor 224 to implement the operational modes of system 200, as described above in detail, to provide rotational drive motion to VCCS compressor 224 to provide cabin air conditioning in accordance with the operational modes.

As in system 100 in FIG. 2, system 200 in FIG. 3 can be mounted within an aircraft using mounting flange 213 and mounting brackets on SGM 218 (not shown). Also, VCCS compressor 224 includes a refrigerant input 228 at which refrigerant from the rest of the VCCS is received and a refrigerant output 230 at which refrigerant is transmitted to the rest of the VCCS.

Figure 4:
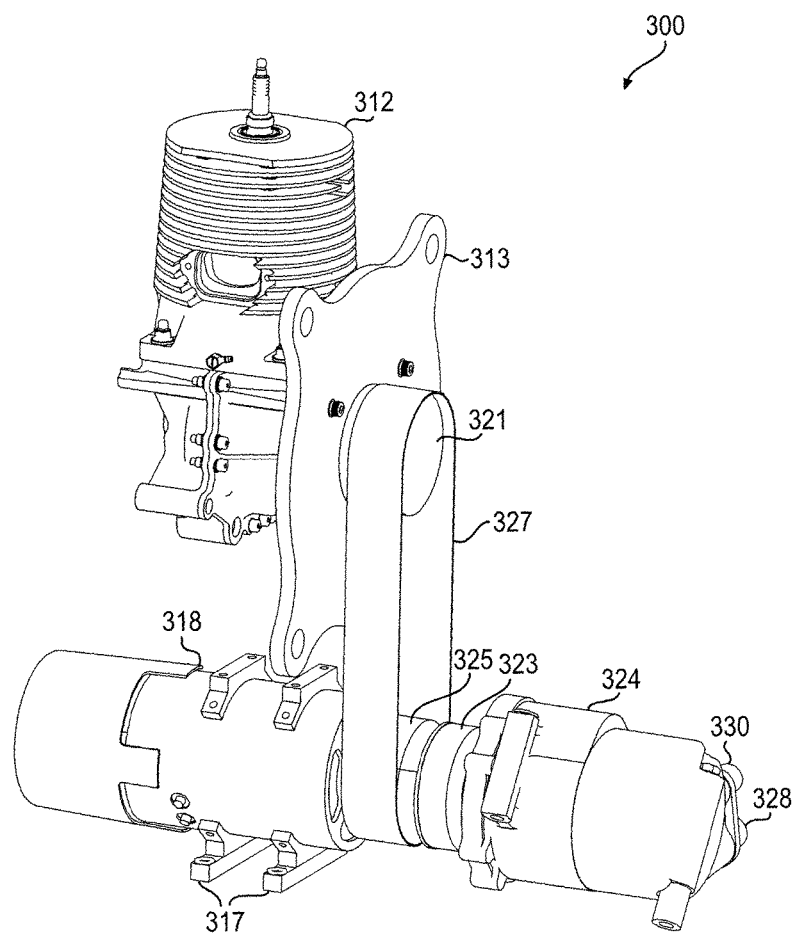
FIG. 4 includes a schematic perspective view of a system including an integrated APU, SGM apparatus, and VCCS compressor, according to some exemplary embodiments.

FIG. 4 includes a schematic perspective view of a system 300 including an integrated APU 312, SGM apparatus 318, and VCCS compressor 324, according to some exemplary embodiments. Operation of system 300 of FIG. 4 is the same as that of systems 100 and 200 described above in detail. Controllable, selectively releasable mechanical coupling is provided among the components in system 300 in accordance with operational modes as described above in detail.

Referring to FIG. 4, system 300 is a hybrid of a direct-drive system and an indirect-drive system. That is, specifically, VCCS compressor 324 and SGM 318 are coupled together in line as shown; however, a pulley 325 is used, along with one or more belts and/or chains 327, to releasably, mechanically couple the combination of SGM 318 and VCCS compressor 324 to APU 312. APU 312 is releasably coupled to the SGM 318 and VCCS compressor 324 via a clutch pulley 321 and belt(s) and/or chain(s) 327. Also, VCCS compressor 324 is releasably coupled to pulley 325 via clutch 323, such that the clutch-pulley 323-325 combination is controllable such that rotational motion can be selectively provided to VCCS compressor 324 as required according to the operational mode in which system 300 is operating, as described above in detail.

As in system 100 in FIG. 2, system 300 in FIG. 4 can be mounted within an aircraft using mounting flange 313 and mounting brackets 317 on SGM 318. Also, VCCS compressor 324 includes a refrigerant input 328 at which refrigerant from the rest of the VCCS is received and a refrigerant output 330 at which refrigerant is transmitted to the rest of the VCCS.

Figure 5:
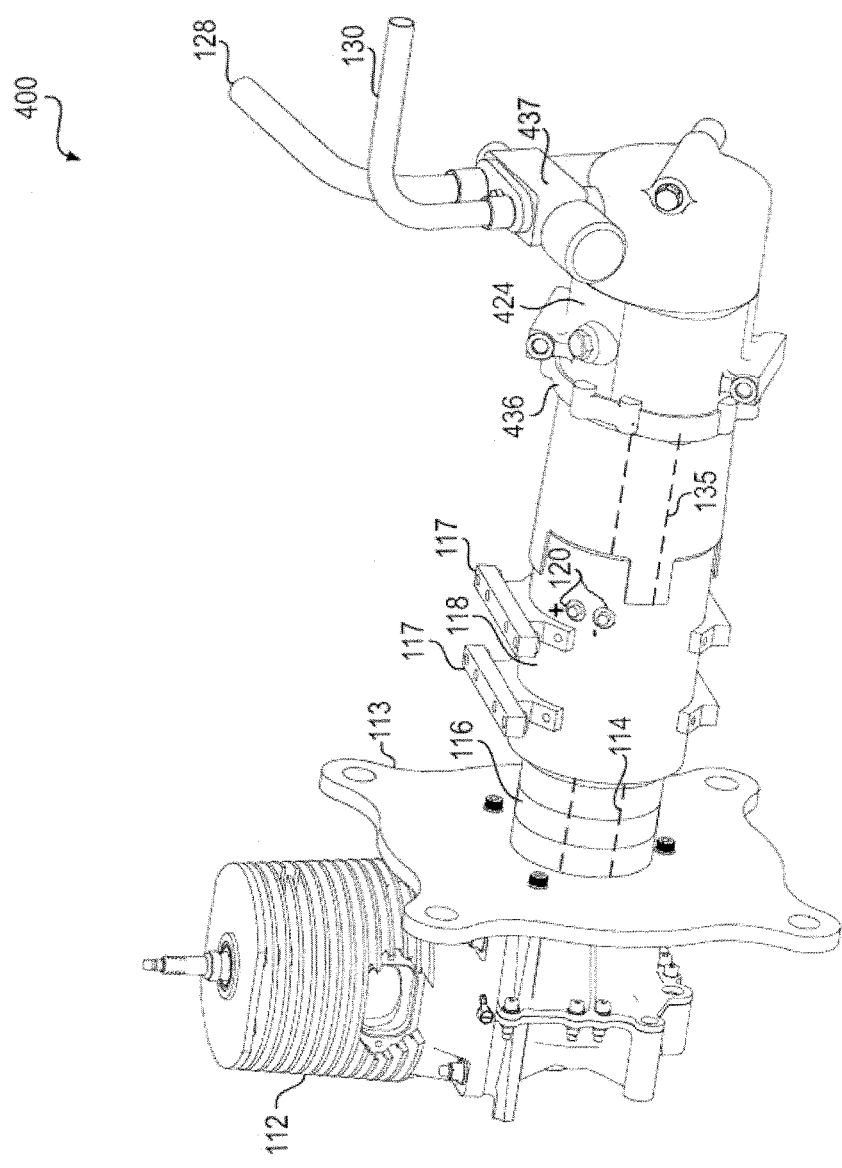
FIG. 5 includes a schematic perspective view of a system including an integrated APU, SGM apparatus, and VCCS compressor, according to some exemplary embodiments.

FIG. 5 includes a schematic perspective view of a system 400 including an integrated APU 112, SGM apparatus 118, and VCCS compressor 424, according to some exemplary embodiments. The operational modes of the embodiments of FIG. 5 are the same as those of the embodiments of FIG. 2, as described above in detail. The embodiments of FIG. 5 are the same as the embodiments of FIG. 2; with the exception that cabin air conditioning is not controllable by selectively providing rotational motion to VCCS compressor 424, as it is with VCCS compressor 124 of FIG. 2. Instead, in system 400 of FIG. 5, SGM 118 is coupled to VCCS compressor 424 via a coupler 436 instead of a clutch mechanism 137, and rotational motion is constantly provided to compressor 424. In the embodiments of FIG. 5, cabin air conditioning is selectively activated via control of an unloading valve 437, which is used to control flow of refrigerant to and from compressor 424. All other elements of the embodiments of FIG. 5 are the same as those of the embodiments of FIG. 2, as indicated by like reference numerals. Detailed description of like elements between the embodiments of FIG. 5 and the embodiments of FIG. 2 will not be repeated.

Unloading valve 437 operates to connect the refrigerant input port 128 and refrigerant output port 130 such that the refrigerant bypasses the rest of the VCCS. As a result, when the unloading valve 437 is activated and the refrigerant bypass is initiated, cabin air conditioning is disabled. This refrigerant bypass is used instead of selectively coupling rotational motion to VCCS compressor 424 to selectively drive VCCS compressor 424 and thereby selectively provide cabin air conditioning, as described in detail above.

Figure 6:
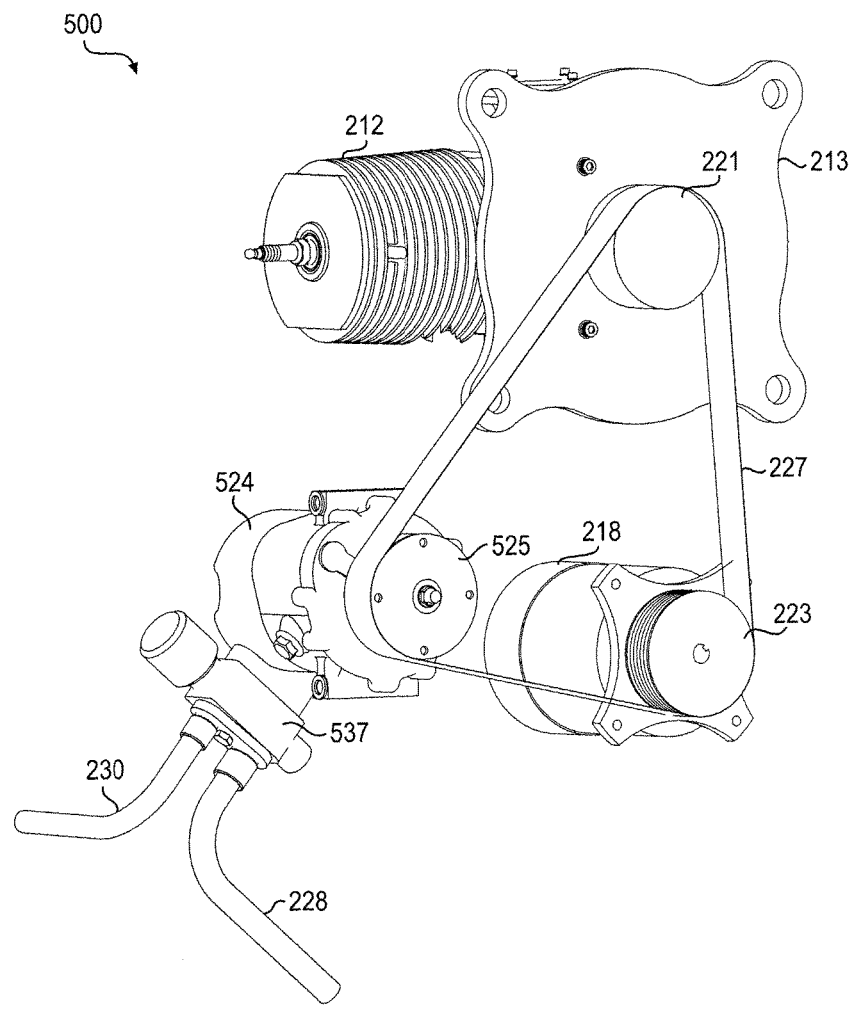
FIG. 6 includes a schematic perspective view of a system including an integrated APU, SGM apparatus, and VCCS compressor, according to some exemplary embodiments.

FIG. 6 includes a schematic perspective view of a system 500 including an integrated APU 212, SGM apparatus 218, and VCCS compressor 524, according to some exemplary embodiments. The operational modes of the embodiments of FIG. 6 are the same as those of the embodiments of FIG. 3, as described above in detail. The embodiments of FIG. 6 are the same as the embodiments of FIG. 3; with the exception that cabin air conditioning is not controllable by selectively providing rotational motion to VCCS compressor 524, as it is with VCCS compressor 224 of FIG. 3. Instead, in system 500 of FIG. 6, SGM 218 is coupled to VCCS compressor 524 via a pulley 525 instead of a clutch pulley 225, and rotational motion is constantly provided to VCCS compressor 524. In the embodiments of FIG. 6, cabin air conditioning is selectively activated via control of an unloading valve 537, which is used to control flow of refrigerant to and from VCCS compressor 524. All other elements of the embodiments of FIG. 6 are the same as those of the embodiments of FIG. 3, as indicated by like reference numerals. Detailed description of like elements between the embodiments of FIG. 6 and the embodiments of FIG. 3 will not be repeated.

Unloading valve 537 operates to connect the refrigerant input port 228 and refrigerant output port 230 such that the refrigerant bypasses the rest of the VCCS. As a result, when the unloading valve 537 is activated and the refrigerant bypass is initiated, cabin air conditioning is disabled. This refrigerant bypass is used instead of selectively coupling rotational motion to VCCS compressor 524 to selectively drive VCCS compressor 524 and thereby selectively provide cabin air conditioning, as described in detail above.

Figure 7:
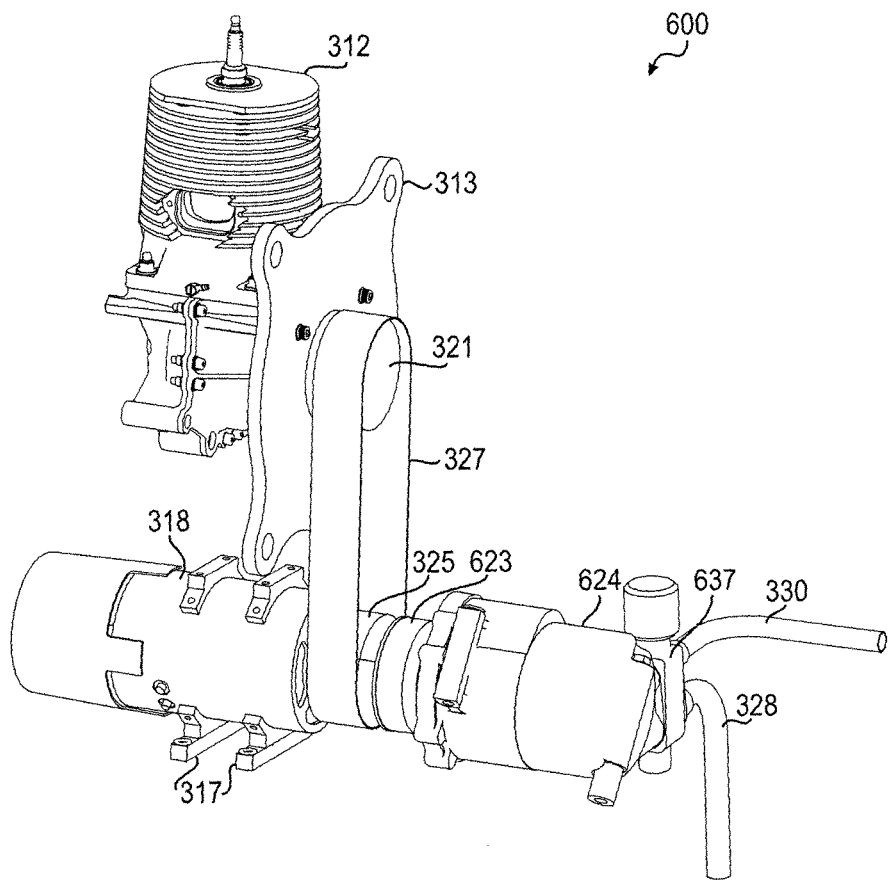
FIG. 7 includes a schematic perspective view of a system including an integrated APU, SGM apparatus, and VCCS compressor, according to some exemplary embodiments.

FIG. 7 includes a schematic perspective view of a system 600 including an integrated APU 312, SGM apparatus 318, and VCCS compressor 624, according to some exemplary embodiments. The operational modes of the embodiments of FIG. 7 are the same as those of the embodiments of FIG. 4, as described above in detail. The embodiments of FIG. 7 are the same as the embodiments of FIG. 4; with the exception that cabin air conditioning is not controllable by selectively providing rotational motion to VCCS compressor 624, as it is with VCCS compressor 324 of FIG. 4. Instead, in system 600 of FIG. 7, SGM 318 is coupled to VCCS compressor 624 via a pulley 325 and coupler 623 instead of a clutch-pulley 323-325 combination, and rotational motion is constantly provided to VCCS compressor 624. In the embodiments of FIG. 7, cabin air conditioning is selectively activated via control of an unloading valve 637, which is used to control flow of refrigerant to and from VCCS compressor 624. All other elements of the embodiments of FIG. 7 are the same as those of the embodiments of FIG. 4, as indicated by like reference numerals. Detailed description of like elements between the embodiments of FIG. 7 and the embodiments of FIG. 4 will not be repeated.

Unloading valve 637 operates to connect the refrigerant input port 328 and refrigerant output port 330 such that the refrigerant bypasses the rest of the VCCS. As a result, when the unloading valve 637 is activated and the refrigerant bypass is initiated, cabin air conditioning is disabled. This refrigerant bypass is used instead of selectively coupling rotational motion to VCCS compressor 624 to selectively drive VCCS compressor 624 and thereby selectively provide cabin air conditioning, as described in detail above.

Figure 8:
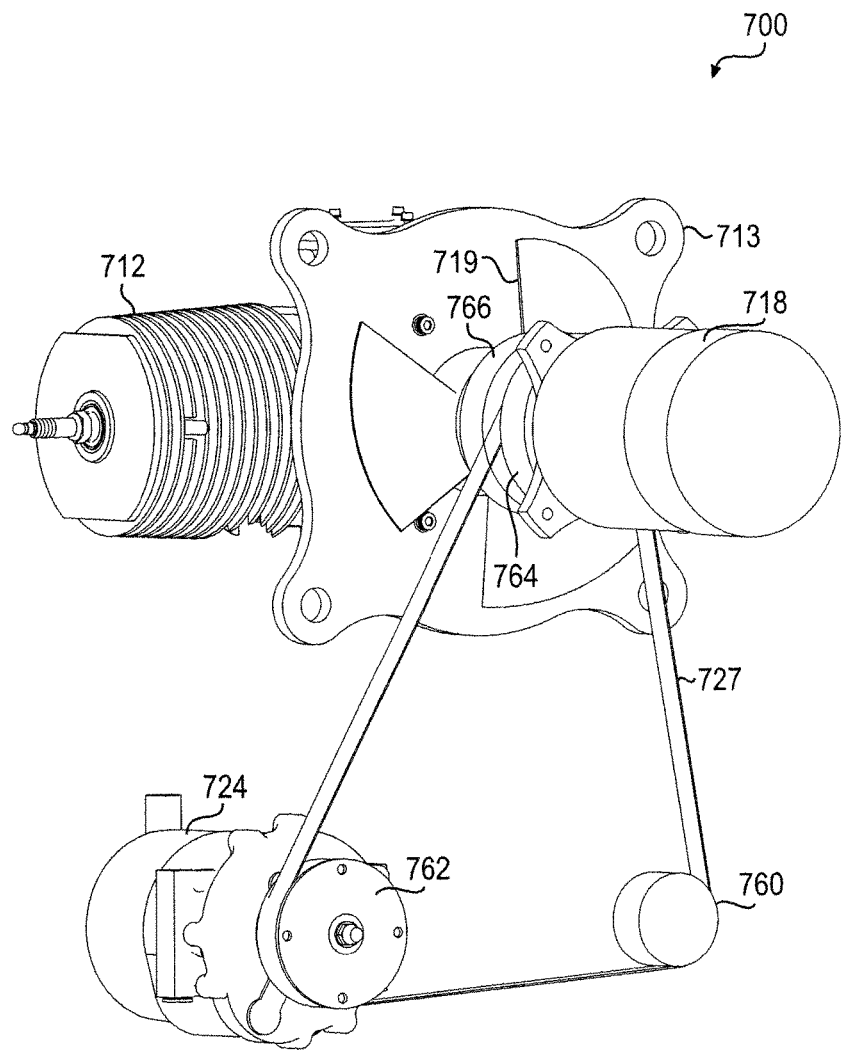
FIG. 8 includes a schematic perspective view of a system including an integrated APU, SGM apparatus, and VCCS compressor, according to some exemplary embodiments.

FIG. 8 includes a schematic perspective view of a system 700 including an integrated APU 712, SGM apparatus 718, and VCCS compressor 724, according to some exemplary embodiments. Referring to FIG. 8, system 700 is a hybrid of a direct-drive system and an indirect-drive system, in which SGM 718 is directly releasably coupled to APU 712, such as by a clutch mechanism 766, which can be a toothed clutch mechanism. The system 700 can be mounted in an aircraft such as by mounting flange 713. VCCS compressor 724 can be releasable coupled to APU 712 and SGM 718 via one or more clutch pulleys 762 and 764, an additional pulley 760, which can be an optional idler pulley, and one or more belts and/or chains 727. System 700 can also include a cooling fan 719 for an air-cooled system. Referring to FIG. 8, the operation of system 700 is the same as that of the various systems described above in detail. The detailed description of other systems according to other embodiments applies to system 700 of FIG. 8. Detailed description of like features between system 700 and systems described in detail above will not be repeated.

Figure 9:
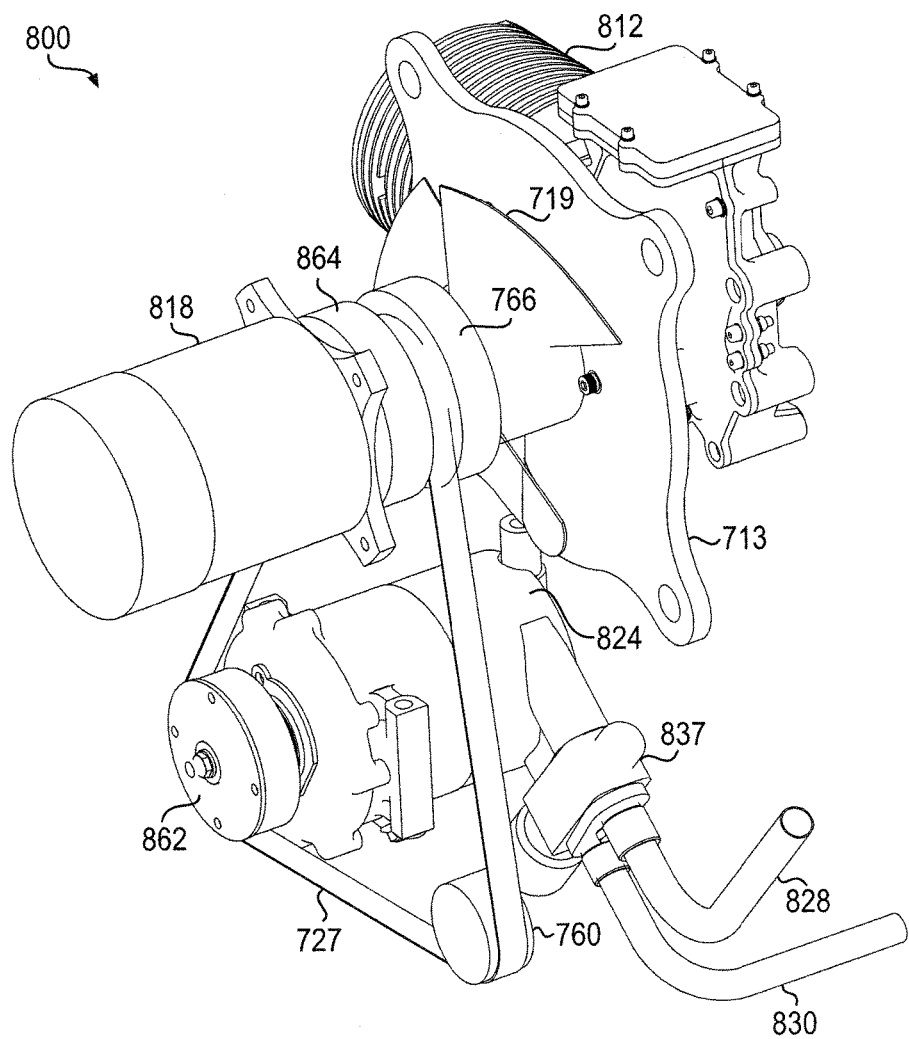
FIG. 9 includes a schematic perspective view of a system including an integrated APU, SGM apparatus, and VCCS compressor, according to some exemplary embodiments.

FIG. 9 includes a schematic perspective view of a system 800 including an integrated APU 812, SGM apparatus 818, and VCCS compressor 824, according to some exemplary embodiments. The operational modes of the embodiments of FIG. 9 are the same as those of the embodiments of FIG. 8, as described above in detail. The embodiments of FIG. 9 are the same as the embodiments of FIG. 8; with the exception that cabin air conditioning is not controllable by selectively providing rotational motion to VCCS compressor 824, as it is with VCCS compressor 724 of FIG. 8. Instead, in system 800 of FIG. 9, SGM 818 is coupled to VCCS compressor 824 via a pulley 862 instead of a clutch pulley 762, and rotational motion is constantly provided to VCCS compressor 824. In the embodiments of FIG. 9, cabin air conditioning is selectively activated via control of an unloading valve 837, which is used to control flow of refrigerant to and from VCCS compressor 824. All other elements of the embodiments of FIG. 9 are the same as those of the embodiments of FIG. 8, as indicated by like reference numerals. Detailed description of like elements between the embodiments of FIG. 9 and the embodiments of FIG. 8 will not be repeated.

Unloading valve 837 operates to connect the refrigerant input port 828 and refrigerant output port 830 such that the refrigerant bypasses the rest of the VCCS. As a result, when the unloading valve 837 is activated and the refrigerant bypass is initiated, cabin air conditioning is disabled. This refrigerant bypass is used instead of selectively coupling rotational motion to VCCS compressor 824 to selectively drive VCCS compressor 824 and thereby selectively provide cabin air conditioning, as described in detail above.

Figure 10:
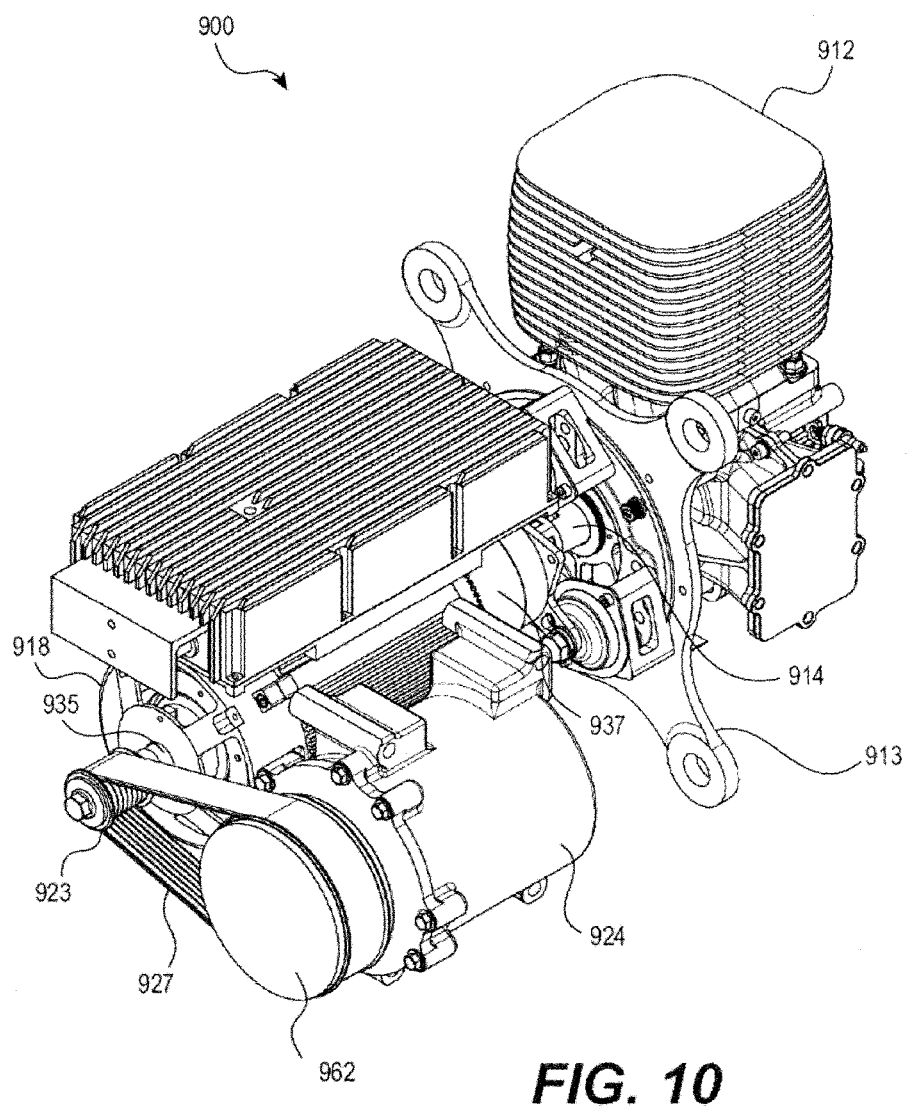
FIG. 10 includes a schematic perspective view of a system including an integrated APU, SGM apparatus, and VCCS compressor, according to some exemplary embodiments.

FIG. 10 includes a schematic perspective view of a system 900 including an integrated APU 912, SGM apparatus 918, and VCCS compressor 924, according to some exemplary embodiments. The operational modes of the embodiments of FIG. 10 are the same as those of the other embodiments described in detail herein. Referring to FIG. 10, the operation of system 900 is the same as that of the various systems described above in detail. The detailed description of other systems according to other embodiments applies to system 900 of FIG. 10. Detailed description of like features between system 900 and systems described in detail above will not be repeated.

Referring to FIG. 10, APU 912 is coupled to SGM 918 via a rigid rotatable output shaft 914 through toothed clutch mechanism 937, such that rotational motion can be selectively transmitted between APU 912 and SGM 918 according to the operational mode as described above in detail. A rigid rotatable output shaft 935 of SGM 918 is connected to a pulley 923 which couples rotational motion from SGM 918 to VCCS compressor 924 via pulley 962 on VCCS compressor 924 and one or more belts and/or chains 927. Although not shown in FIG. 10, cabin air conditioning is selectively controlled via an unloading valve connected to provide input and output refrigerant bypass around the rest of the VCCS, as described above in detail in connection with other exemplary embodiments.

Figure 11:
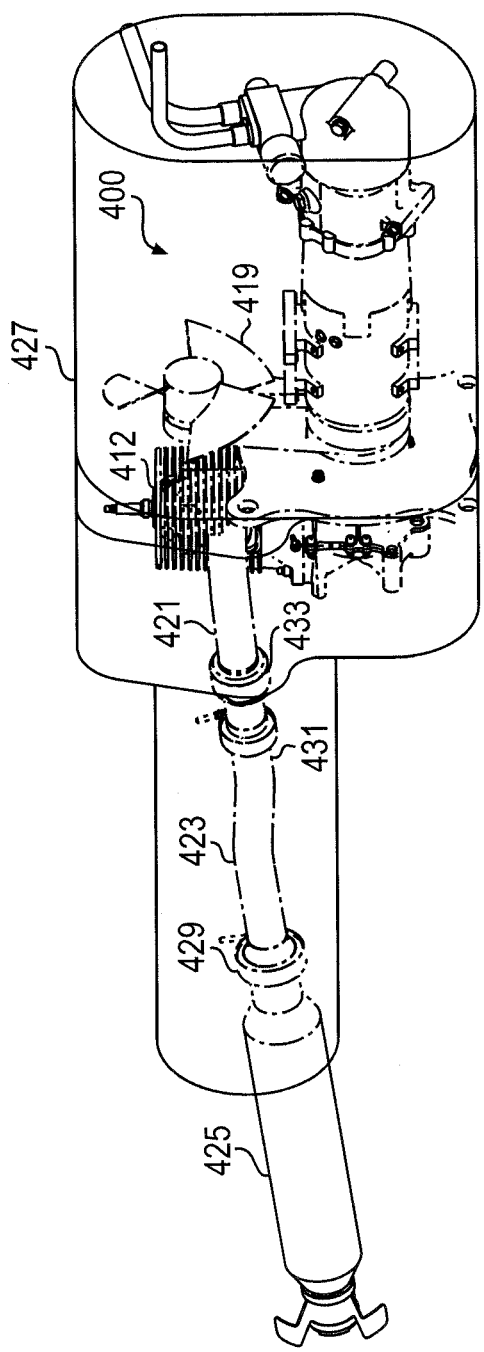
FIG. 11 includes a schematic perspective view of an integrated APU, SGM apparatus, and VCCS compressor system contained entirely within a fireproof enclosure of an aircraft, according to some exemplary embodiments.
Figure 12:
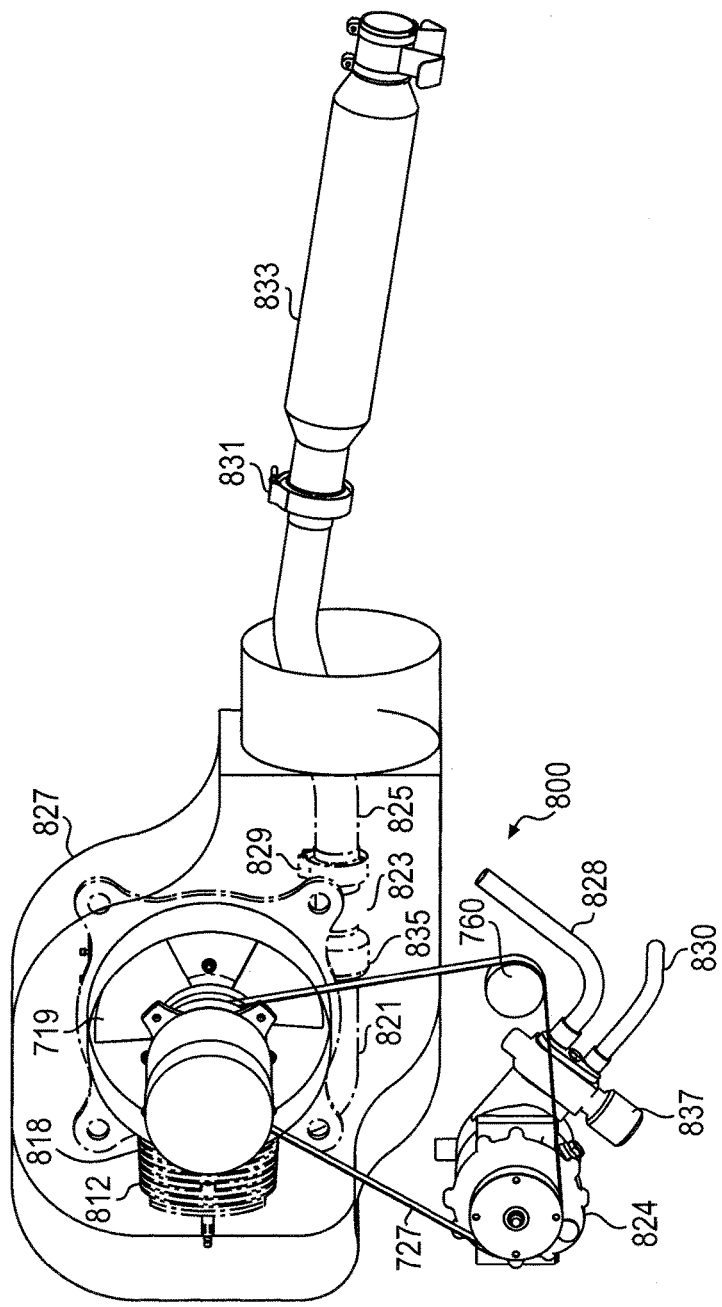
FIG. 12 includes a schematic perspective view of an integrated APU, SGM apparatus, and VCCS compressor system contained partially within a fireproof enclosure of an aircraft, according to some exemplary embodiments.

The integrated APU, SGM apparatus, and VCCS compressor system described herein can be located at least partially within a fireproof enclosure, i.e., "firebox," of the aircraft. Exemplary embodiments of integrated APU, SGM apparatus, and VCCS compressor systems according to the present disclosure are illustrated in FIGS. 11 and 12. Specifically, FIG. 11 is a schematic perspective view of integrated APU, SGM apparatus, and VCCS compressor system 400 illustrated in and described in detail above in connection with FIG. 5, contained entirely within firebox 427. Exhaust pipes and connections 421, 423, 425, 429, 431 and 433 route exhaust gases from APU 412 to the exterior of firebox 427 and eventually out of the aircraft. Fan 419 provides cooling for air-cooled systems.

FIG. 12 is a schematic perspective view of integrated APU, SGM apparatus, and VCCS compressor system 800 illustrated in and described in detail above in connection with FIG. 9, contained partially within firebox 827. Exhaust pipes and connections 821, 823, 825, 829, 831, 833 and 835 route exhaust gases from APU 812 to the exterior of firebox 827 and eventually out of the aircraft. Fan 719 provides cooling for air-cooled engines. As noted above, system 800 is only partially contained within firebox 827. Specifically, VCCS compressor 824 with unloading valve 837 and refrigerant input 828 and output 830, and pulley 760 are outside of firebox 827. APU 812 and SGM 818 are inside firebox 827. Belt(s) and/or chain(s) 727 penetrate firebox 827 to mechanically couple the exterior and interior system components.

It will be understood that FIGS. 11 and 12, and the corresponding detailed descriptions thereof, are used as illustrative examples only. It will be understood that any of the embodiments of systems described herein may be used in connection with a fireproof enclosure, i.e., firebox.

It should be noted that in the present disclosure, the invention is described in detail as being applicable to air-cooled engines. It is not necessary that the invention be applied to air-cooled engines. The present invention and the present Detailed Description are also applicable to liquid-cooled engines.

FIGS. 13 through 16 include schematic perspective views of a portion of an aircraft 1000 illustrated in phantom with an integrated APU and VCCS compressor system installed in each of four possible locations in the aircraft 1000, according to some exemplary embodiments. FIGS. 13 through 16 illustrate system 800 of FIG. 9 with enclosure 827, as illustrated in FIG. 12, as an exemplary embodiment. It will be understood that FIGS. 13 through 16 could illustrate, and the present description is applicable to, any of the exemplary embodiments of integrated APU, SGM apparatus, and VCCS compressor systems illustrated and described in detail herein. It will be understood that the present invention and disclosure are applicable to any aircraft in which an APU, starter, generator, motor, and/or a VCCS can be used, or in any aircraft with one, two, or more turbine or piston propulsion engines. Additionally, it should be understood that the term "aircraft" as used in this application would include any vehicle used for flight, e.g., helicopters, gyros, hovercraft, airships (lighter and heavier than air), in addition to airplanes.

Figure 13:
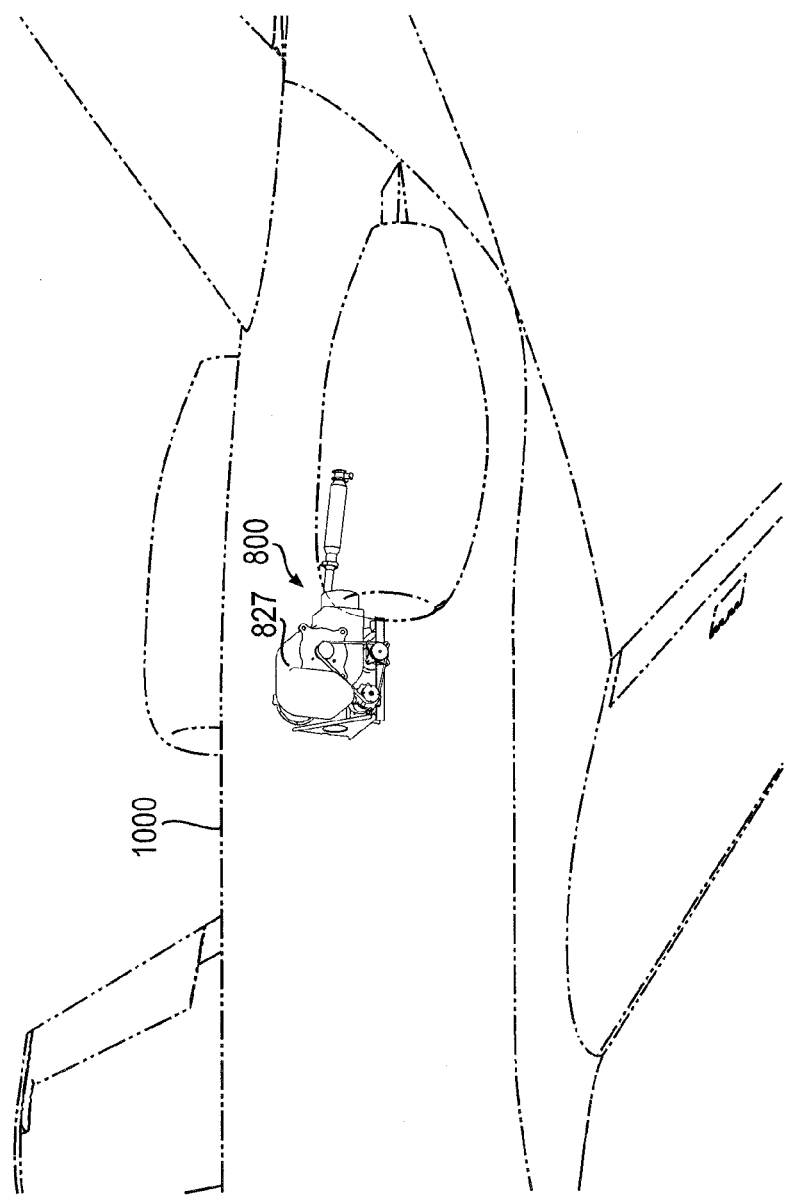
FIGS. 13 through 16 include schematic perspective views of a portion of an aircraft with an integrated APU, SGM apparatus, and VCCS compressor system installed in each of four possible locations in the aircraft, according to some exemplary embodiments.
Figure 14:
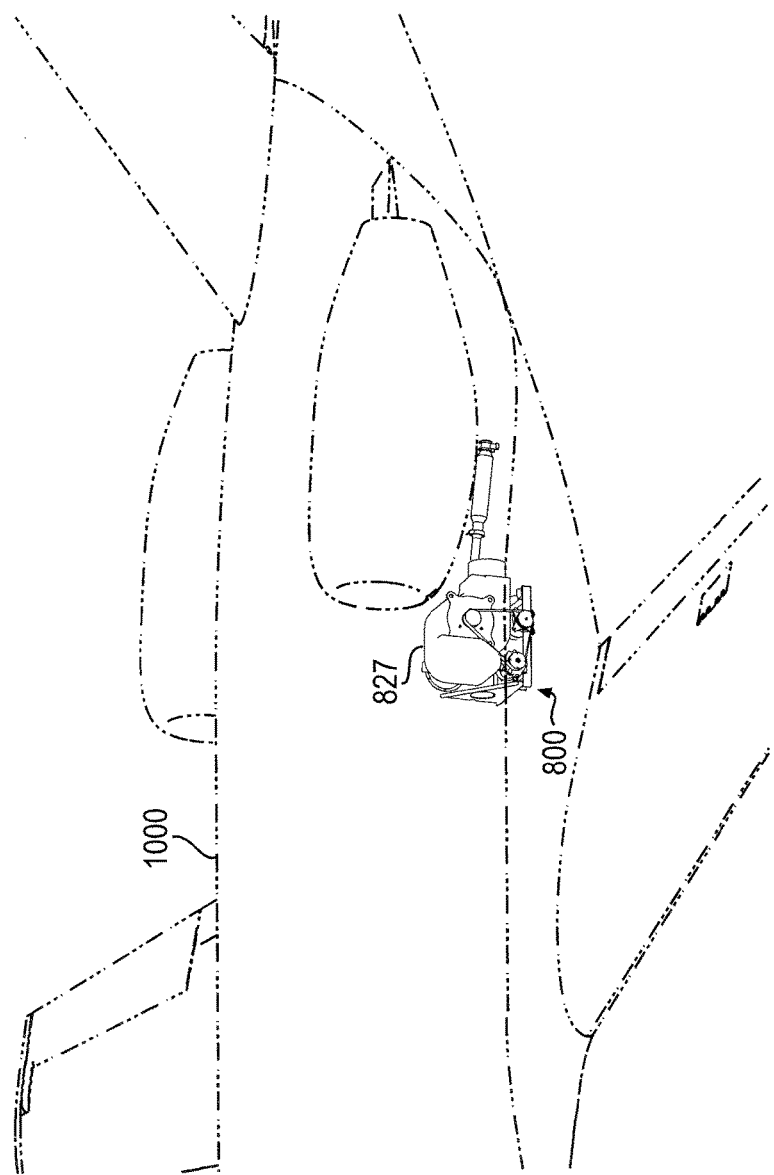
Figure 15:
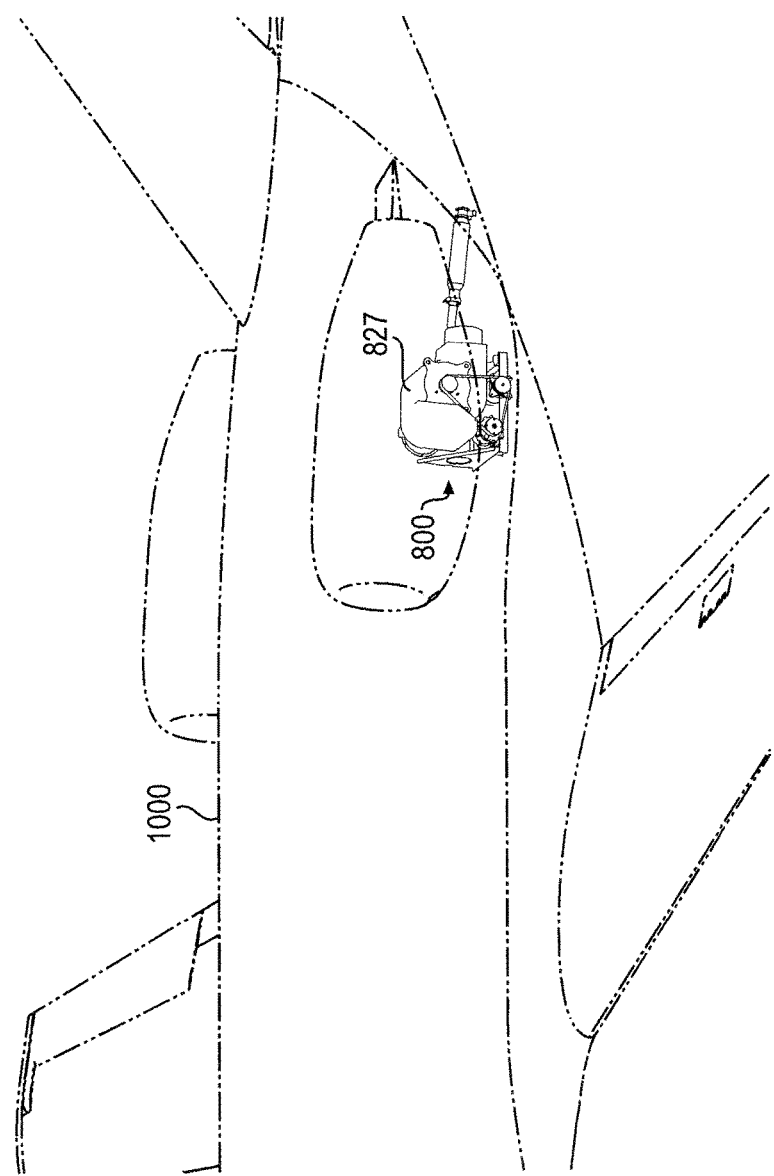
Figure 16:
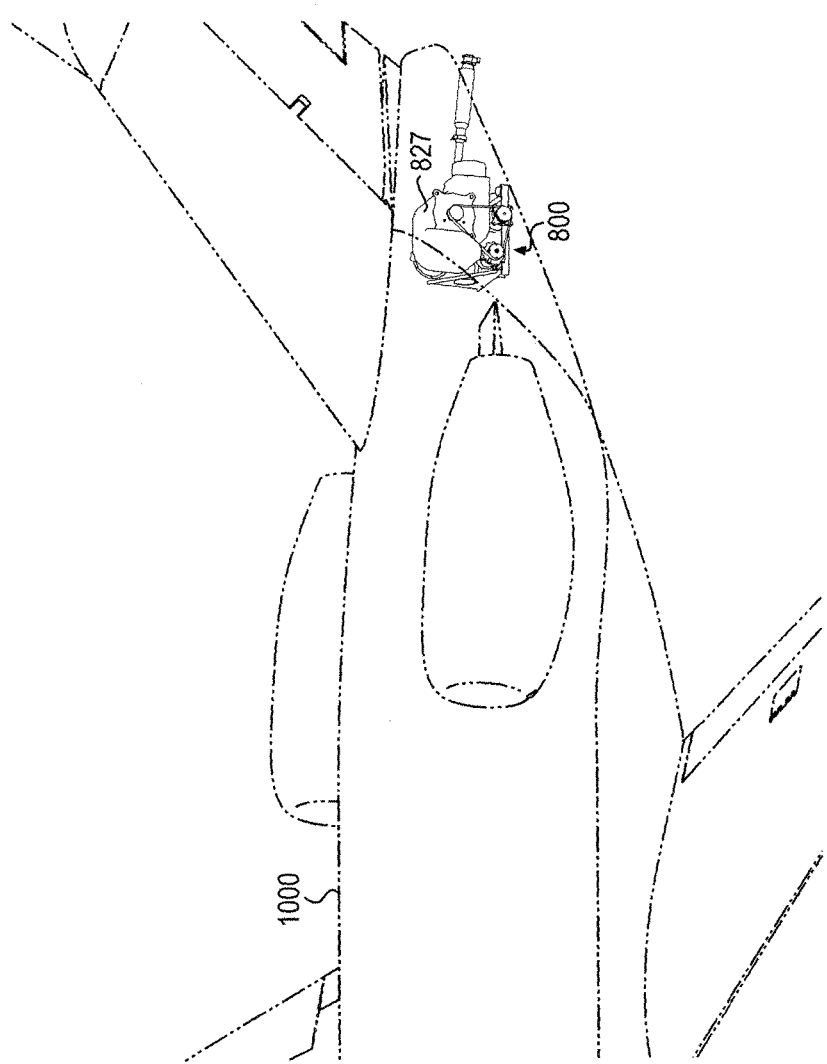

In FIG. 13, system 800 with firebox 827 is located forward and right-hand outboard of a baggage compartment of aircraft 1000. In FIG. 14, system 800 with firebox 827 is located forward and below the baggage compartment of aircraft 1000. In FIG. 15, system 800 with firebox 827 is located aft of the baggage compartment of aircraft 1000. In FIG. 16, system 800 with firebox 827 is located in the stinger of aircraft 1000.

Figure 17:
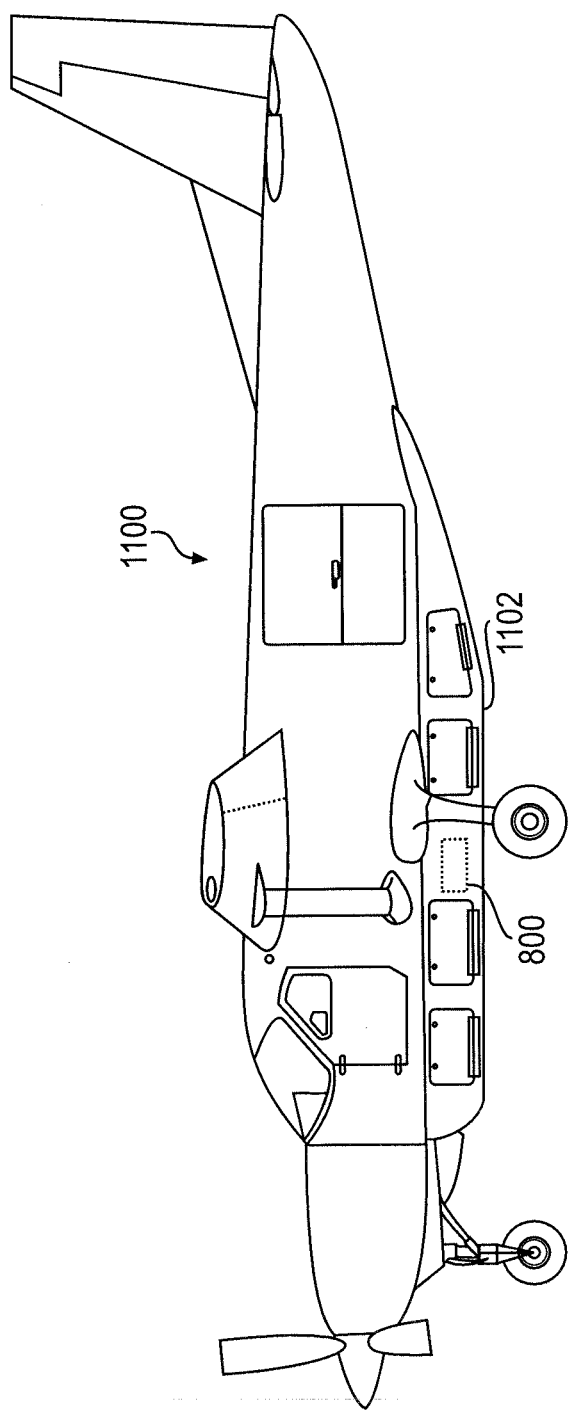
FIG. 17 includes a schematic side view of a single turbine/propeller aircraft with an integrated APU, SGM apparatus, and VCCS compressor system installed in the belly fairing/external cargo enclosure of the aircraft, according to some exemplary embodiments.
Figure 18:
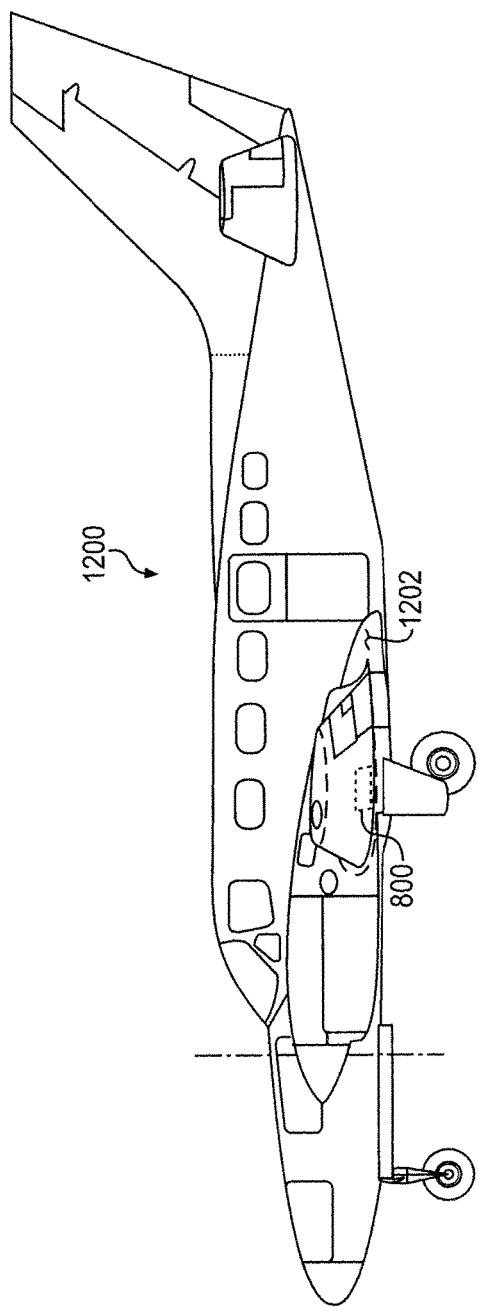
FIG. 18 includes a schematic side view of a twin-engine aircraft with an integrated APU, SGM apparatus, and VCCS compressor system installed in the nacelle locker of the aircraft, according to some exemplary embodiments.

FIGS. 17 and 18 are side views of other aircraft in which the system 800, or any of the embodiments of the invention described herein, can be installed. Again, as with FIGS. 13-16, the depiction of system 800 is exemplary only. It will be understood that FIGS. 17 and 18 could illustrate, and the present description is applicable to, any of the exemplary embodiments of integrated APU and VCCS compressor systems illustrated and described in detail herein. FIG. 17 illustrates a single-engine aircraft 1100, and FIG. 18 illustrates a twin-engine aircraft 1200. FIG. 17 illustrates system 800 in the belly fairing/external cargo enclosure 1102 of aircraft 1100, and FIG. 18 illustrates system 800 in the nacelle locker 1202 of aircraft 1200.

It should be noted that the present disclosure and invention are applicable to all of the possible permutations of the six different configurations of aircraft and integrated APU, SGM apparatus, and VCCS systems illustrated in FIGS. 13-16, including all of the embodiments of integrated APU, SGM apparatus, and VCCS systems described herein. That is, any of the integrated APU, SGM apparatus, and VCCS systems described herein can be installed in any of the types of aircraft used as illustrative examples herein, in any of the locations within the fuselage of the aircraft, in the belly fairing/external cargo enclosure of the aircraft or in the nacelle locker of the aircraft, as appropriate. It should also be recognized that similar systems using an APU, starter, generator, motor, and/or air conditioning system could be employed on other vehicles in addition to the aircraft embodiments discussed above.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

We claim:

1. A system for an aircraft, comprising:
a refrigerant compressor for a vapor cycle cooling system (VCCS) for providing air conditioning using a phase-changing fluid;
an auxiliary power unit (APU) for mechanically driving the compressor; and
an energy-conversion device operable in any of a starter mode, a generator mode and a motor mode, the energy-conversion device comprising: (i) a first coupling element for selectively coupling and uncoupling the energy-conversion device to the APU such that, in the starter mode, the energy-conversion device is used in driving the APU, (ii) a second coupling element for coupling and uncoupling the energy-conversion device to the compressor such that, in the motor mode, the energy-conversion device mechanically drives the compressor, and (iii) electrical power terminals output element at which, in the generator mode, the energy-conversion device provides electrical output power for powering an aircraft electrical system and, in the starter mode or motor mode, the energy-conversion device receives electrical input power from an external electrical power source.

2. The system of claim 1, wherein the APU is one of a piston engine or a turbine engine.

3. The system of claim 1, wherein the first coupling element comprises a clutch for mechanically coupling and decoupling the energy-conversion device to the APU.

4. The system of claim 3, wherein the clutch is an electromechanical tooth clutch.

5. The system of claim 1, wherein the second coupling element comprises a clutch for mechanically coupling and decoupling the energy-conversion device to the compressor.

6. The system of claim 1, wherein the second coupling element comprises a pulley.

7. The system of claim 1, wherein the second coupling element comprises a belt.

8. The system of claim 1, further comprising a fireproof enclosure.

9. The system of claim 8, wherein the compressor, the engine and the energy-conversion device are contained within the fireproof enclosure, and at least one of: (i) a shaft, (ii) a coupler, (iii) a belt, and (iv) a chain penetrates the firebox to enable mechanically couple at least one exterior component to one of the said compressor, engine and energy-conversion device.

10. The system of claim 1 wherein the energy-conversion device is a starter-generator-motor (SGM) apparatus.

11. An integrated auxiliary power unit (APU), starter-generator-motor (SGM) apparatus, and vapor cycle cooling system (VCCS) for an aircraft, comprising:
a fireproof enclosure;
a compressor for the VCCS, the compressor being disposed within the fireproof enclosure;

the APU mechanically driving the compressor, the APU being disposed within the fireproof enclosure; and a starter-generator-motor (SGM) apparatus operable in any of a starter mode, a generator mode and a motor mode, the SGM apparatus comprising: (i) a first coupling element for selectively coupling and decoupling the SGM apparatus to the APU such that, in the starter mode, the SGM apparatus is used in driving the APU, (ii) a second coupling element for coupling the SGM apparatus to the VCCS compressor such that, in the motor mode, the SGM apparatus mechanically drives the VCCS compressor, and (iii) electrical power terminals at which, in the generator mode, the SGM apparatus provides electrical output power for powering an aircraft electrical system and, in the starter mode or motor mode, the SGM apparatus receives electrical input power from an external electrical power source;

the APU, the SGM apparatus, and the VCCS compressor are all disposed within the fireproof enclosure.

12. The APU, SGM apparatus, and VCCS of claim 11, wherein the engine is a piston engine.

13. The APU, SGM apparatus, and VCCS of claim 11, wherein the first coupling element comprises a clutch for mechanically coupling the SGM apparatus to the engine.

14. The APU, SGM apparatus, and VCCS of claim 13, wherein the clutch is an electromechanical tooth clutch.

15. The APU, SGM apparatus, and VCCS of claim 11, wherein the second coupling element comprises a clutch for mechanically coupling the SGM apparatus to the compressor.

16. The APU, SGM apparatus, and VCCS of claim 11, wherein the second coupling element comprises a belt and pulley system.

17. The APM, SGM apparatus, and VCCS of claim 11 wherein the engine is a turbine.

18. The APU, SGM apparatus, and VCCS of claim 11, wherein the VCCS compressor circulates a refrigerant, and circulation of the refrigerant through the VCCS system for air conditioning is selectively allowed or denied using a bypass configured for the refrigerant during generator mode.

19. The APU, SGM apparatus, and VCCS of claim 11, wherein the bypass is created using an unloading valve.

20. A method comprising:

providing an energy-conversion device;

operating an energy-conversion device in a starter mode to start an auxiliary power unit (APU);

operating the energy-conversion device in a motor mode in order to drive a compressor for selectively transmitting a refrigerant in an air-conditioning system; and operating the energy-conversion device in a generator mode to generate power for electricity-consuming equipment in a vehicle while preventing circulation of the refrigerant into the air-conditioning system by one of: (i) enabling the decoupling of the compressor from the energy-conversion device, and (ii) creating a refrigerant bypass such that the refrigerant is not circulated into the air-conditioning system.

* * * * *

UNITED STATES PATENT AND TRADEMARK OFFICE
CERTIFICATE OF CORRECTION

| | |
|---|---|
| PATENT NO. | : 10,266,276 B2 |
| APPLICATION NO. | : 14/219424 |
| DATED | : April 23, 2019 |
| INVENTOR(S) | : Charles Beuning et al. |

It is certified that error appears in the above-identified patent and that said Letters Patent is hereby corrected as shown below:

On the Title Page

Under (72) Inventors:
"Vernon Weng-Yew Change"
Should read:
--Vernon Weng-Yew Chang--

Signed and Sealed this
Eighteenth Day of June, 2019

Andrei Iancu
*Director of the United States Patent and Trademark Office*